No. 757,317. PATENTED APR. 12, 1904.
E. KINNEY.
CUTTER FOR LINOLEUM OR THE LIKE.
APPLICATION FILED JAN. 4, 1904.
NO MODEL.
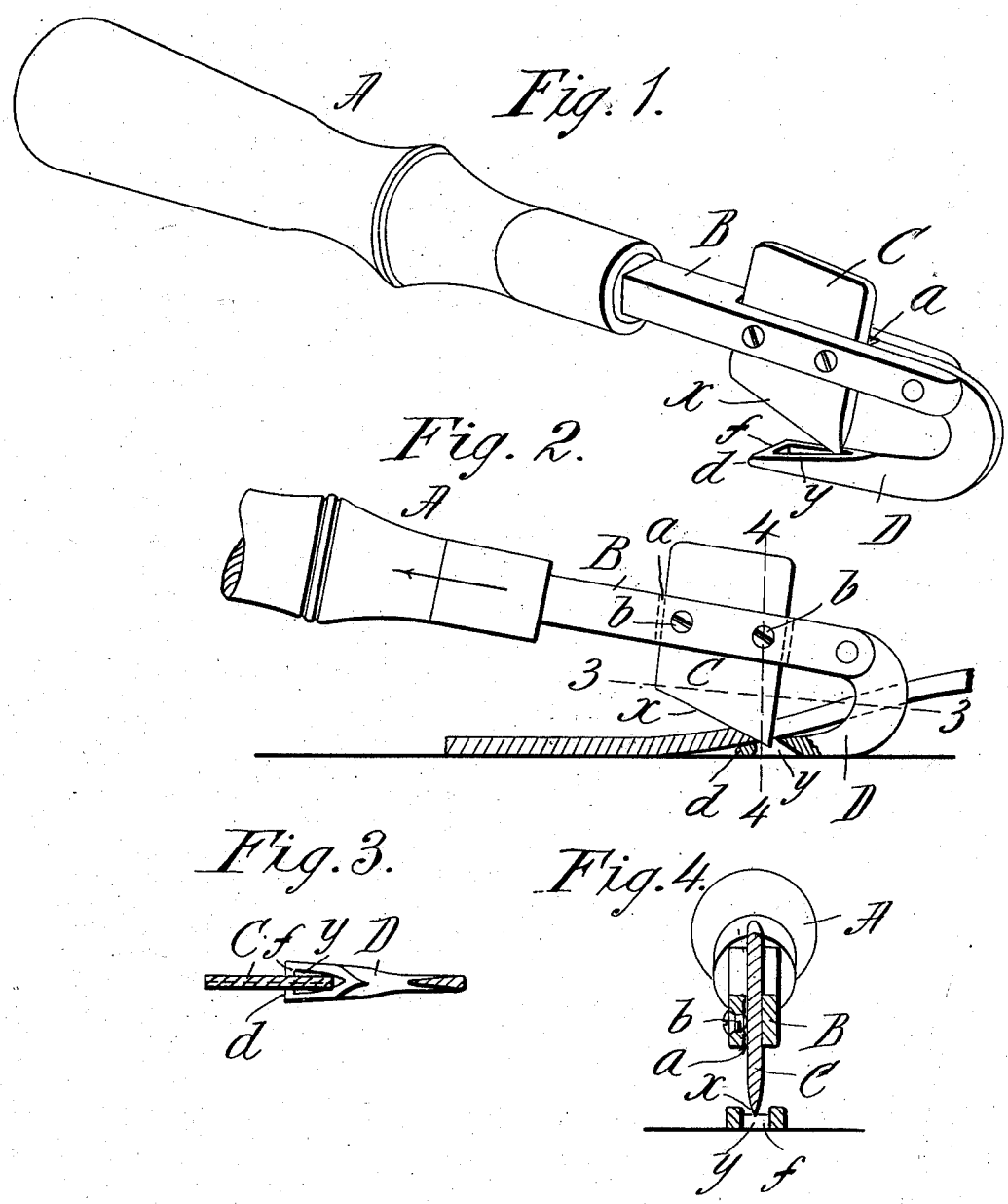

No. 757,317.

Patented April 12, 1904.

UNITED STATES PATENT OFFICE.

EDWARD KINNEY, OF HOLYOKE, MASSACHUSETTS.

CUTTER FOR LINOLEUM OR THE LIKE.

SPECIFICATION forming part of Letters Patent No. 757,317, dated April 12, 1904.

Application filed January 4, 1904. Serial No. 187,638. (No model.)

*To all whom it may concern:*

Be it known that I, EDWARD KINNEY, a citizen of the United States of America, and a resident of Holyoke, in the county of Hampden and State of Massachusetts, have invented certain new and useful Improvements in Cutters for Linoleum or the Like, of which the following is a full, clear, and exact description.

This invention relates to a tool or implement for cutting linoleum, leather, or other similar material or fabric.

The object is to provide a tool which may be conveniently and effectively employed for a draw cut and whereby the linoleum or other material may be quickly and cleanly cut or trimmed on a straight line or otherwise and whether the same is resting upon the floor or table or other support, there being no liability in the use of the tool of the blade thereof cutting into the floor, table, or bench for the impairment of the cutter and injury to whatever may at the time of the operation constitute the support for the fabric or material.

The invention consists in a cutting-tool comprising parts in combination and arrangement and structural formations, substantially as hereinafter fully described in connection with the accompanying drawings and set forth in the claims.

In the drawings, Figure 1 is a perspective view of the improved cutter. Fig. 2 is a side view and partial section of the same indicated as in the draw-cutting operation. Fig. 3 is a horizontal longitudinal section as taken on line 3 3, Fig. 2; and Fig. 4 is a vertical cross-section as taken on the line 4 4, Fig. 2.

Similar characters of reference indicate corresponding parts in all of the views.

The tool or implement comprises a suitable handle A, having a tang or shank B, constituting a support or holder for the cutting-blade C, and having a return bent and underlying portion or extension D, which serves as a guard for the cutting edge of the blade. The shank B has an opening $a$, extending longitudinally thereof for a suitable distance, such opening being through the shank from its upper to its lower edges, and the blade having an intermediate portion thereof within the opening $a$ is firmly held in place and in its proper adjustment by the set-screws $b$ $b$, which thread through the shank at one side of the opening and by their inner ends bearing against the side of the blade crowd and bind it firmly against the portion of the shank at the opposite side of the opening. The blade arranged in the median vertical longitudinal plane of the tool has its portion depending below the shank formed with a cutting edge $x$, which inclines upwardly toward the handle end of the tool, and the corner of the blade which is toward the return-bend of the shank and farthest from the handle extends downwardly into, but not entirely through, the socket $y$ in the underlying portion D of the tang, such portion having the socket being of a wedge shape, tapering toward the handle end. The point or edge of the portion D is rounded, as represented at $d$, so as not to gouge into the floor, and the transverse uniting portion $f$ is in the form of the implement, as shown, provided as an integral portion of the extremity of the part D, making an end wall for the socket $y$; but this transverse uniting portion might be omitted, leaving the guard in the form of double divergent claws.

In the use of the implement the handle is grasped in the hand, the extremity of the return bent portion D of the tang is inserted under the edge of the linoleum to be cut at the proper line, and the tool is drawn in the direction of the arrow, Fig. 2, for as long or short a distance as required for severing a long or short piece of the material, it being understood that the wedge-shaped extremity of the underturned part of the blade-holder crowds the fabric upwardly and carries it to the action of the blade, and by having the aperture $y$ in the guard portion sufficiently wide, so as to leave some space at either side of portion of the blade which protudes downwardly into such aperture or socket, there will be a clearance of any shreds or ravelings which may become separated from the fabric along the line of cut in the cutting operation.

Having thus described my invention, what I claim, and desire to secure by Letters Patent, is—

1. In an implement of the character described, in combination, a handle having a shank provided with an underturned extension, having an upwardly-opening socket therein and a blade carried by an intermediate portion of said shank in the median vertical longitudinal plane of the implement, and depending therebelow and having its extremity protruding downwardly into said upwardly-opening socket.

2. In an implement of the character described, in combination, a handle having a shank provided with an underlying return bent extension D having an upwardly-opening socket therein, and a blade carried by an intermediate portion of the shank having at its lower end a cutting edge which is inclined upwardly toward the handle end of the implement, a portion of the blade protruding downwardly into said upwardly-opening socket.

3. In an implement of the character described, in combination, a handle having a shank provided at an intermediate portion thereof with the vertical aperture $a$ therethrough and provided with the underlying return bent wedge-formed extension D having the upwardly-opening socket $y$ therein, the blade having a portion thereof located within said aperture and having set-screws therefor which screw through portion of the shank at one side of the said aperture and have a binding engagement against the blade, the lower end of said blade having a cutting edge which is inclined upwardly toward the handle end of the implement, its corner farthest from such end protruding within the said socket.

Signed by me at Springfield, Massachusetts, in presence of two subscribing witnesses.

EDWARD KINNEY.

Witnesses:
   Wm. S. Bellows,
   A. V. Leahy.